(No Model.)
D. B. MORISON.
SELF LUBRICATING PISTON.
No. 414,777. Patented Nov. 12, 1889.
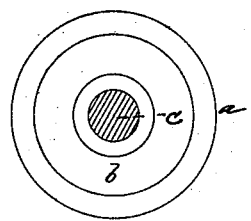
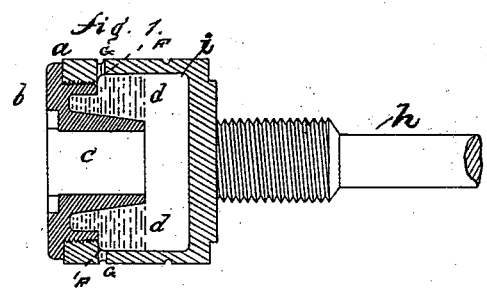
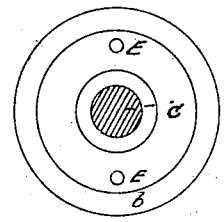
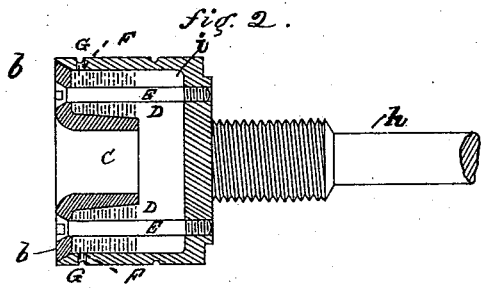
Witnesses.
James Fleming.
Herbert Braun
Inventor.
Donald Barns Morison.
per
E. Eaton
Attorney.

UNITED STATES PATENT OFFICE.

DONALD BARNS MORISON, OF HARTLEPOOL, COUNTY OF DURHAM, ENGLAND.

SELF-LUBRICATING PISTON.

SPECIFICATION forming part of Letters Patent No. 414,777, dated November 12, 1889.

Application filed February 26, 1889. Serial No. 301,279. (No model.) Patented in England June 4, 1888, No. 8,113.

*To all whom it may concern:*

Be it known that I, DONALD BARNS MORISON, a subject of the Queen of Great Britain, residing at Hartlepool, England, have invented new and useful Improvements in Self-Lubricating Pistons for Steam or other Indicators, (for which I have obtained Letters Patent in Great Britain, June 4, 1888, No. 8,113,) of which the following is a specification.

My invention relates to the lubrication of pistons for steam or other indicators; and it consists in forming a reservoir for the lubricant in the bottom or that part of the piston acted on by the steam or other fluid in such a manner that the steam or other fluid is in contact with the surface of the lubricant in such reservoir, and forces it to the outer surface of the piston through suitable holes or openings.

In carrying out my invention in the case of an ordinary steam-engine indicator-piston I construct my improved piston as follows: The piston consists of a cylinder, to the top of which the piston-rod $h$ is attached. The bottom of this cylinder, or that part upon which the steam acts, is hollowed out to form a cavity or cup $i\ i$, and this cavity is covered by a suitably-fixed disk having a tube or tubular projection at or near its center, which projects into the interior of the cavity. The space in the piston between the inner circumference of the cavity and the outer circumference of the tube or tubular projection is the reservoir for the oil or other lubricant, which is thus subjected to the full pressure of the steam which is acting upon the piston. On and around the outer surface of the piston are one or more ordinary lubricating-grooves, which are, or one of which is, connected to the reservoir by one or more holes. The oil or other lubricant being forced by the pressure into the groove or grooves lubricates the surface of the piston, and the pressure of the lubricant in the groove or grooves tends to prevent the rush of steam past or into the grooves, and so assists in keeping the impurities carried in the steam from being forced between the piston and the cylinder.

In order that my invention may be fully understood, I will now particularly describe the same with reference to the accompanying drawings.

Figure I shows a method of applying my invention to a new indicator-piston, and Fig. II shows a method of applying the same to existing pistons.

In Fig. I the metal $a$ at the bottom of the piston has a screw-thread cut on its inner face. The bottom disk $b$, with the tube or tubular projection C formed upon it, is screwed into this. The space $d\ d$ around this projecting part and within the piston is the reservoir for the oil or other lubricant.

In Fig. II the bottom disk $b$ is secured in position by means of the screws E E, the reservoir for the lubricant being formed as in the previous case. The steam or other fluid acting upon the bottom of the piston passes freely through the tube or tubular projections C, and acts upon the surface of the lubricant in the space $d\ d$. The lubricant will thus be forced through the holes F F into the groove or grooves G G, and so the body of the piston will be suitably and uniformly lubricated. The lubricant in the groove or grooves G G will assist in keeping the impurities carried by the steam from being forced between the piston and the cylinder.

Having now particularly described and ascertained the nature of my said invention and in what manner the same is to be performed, I declare that what I claim is—

A piston consisting of a cup, a rod connected thereto, and a bottom having an inwardly-extended central tubular projection, said cup being provided on its exterior with annular grooves, and one of the latter having openings extending into the interior of the cup which is adapted to contain lubricating material, substantially as described.

DONALD BARNS MORISON.

Witnesses:
T. HARRY TILLY,
   *Notary Public, West Hartlepool.*
I. T. NEWBEGIN,
   *West Hartlepool.*